US008948142B2

(12) United States Patent
Xing et al.

(10) Patent No.: US 8,948,142 B2
(45) Date of Patent: Feb. 3, 2015

(54) METHOD, DEVICE AND SYSTEM FOR DETERMINING RESOURCE LOCATIONS

(75) Inventors: Yanping Xing, Beijing (CN); Xiaoka Li, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 235 days.

(21) Appl. No.: 13/382,524

(22) PCT Filed: Aug. 11, 2010

(86) PCT No.: PCT/CN2010/075912
§ 371 (c)(1),
(2), (4) Date: Feb. 4, 2012

(87) PCT Pub. No.: WO2011/018038
PCT Pub. Date: Feb. 17, 2011

(65) Prior Publication Data
US 2012/0106521 A1    May 3, 2012

(30) Foreign Application Priority Data

Aug. 11, 2009    (CN) .......................... 2009 1 0090792

(51) Int. Cl.
*H04J 3/00*      (2006.01)
*H04W 48/08*   (2009.01)
*H04W 28/26*   (2009.01)
*H04W 72/00*   (2009.01)
*H04W 72/04*   (2009.01)

(52) U.S. Cl.
CPC .............. *H04W 48/08* (2013.01); *H04W 28/26* (2013.01); *H04W 72/00* (2013.01); *H04W 72/0446* (2013.01)
USPC ........................................................ 370/336

(58) Field of Classification Search
USPC .......................................... 370/336, 341, 312
See application file for complete search history.

(56) References Cited

U.S. PATENT DOCUMENTS

2009/0168683 A1*   7/2009   Franceschini et al. ........ 370/312

FOREIGN PATENT DOCUMENTS

CN    1430361 A    7/2003
CN    1860820 A    11/2006

OTHER PUBLICATIONS

International Search report issued in International Application No. PCT/CN2010/075912, dated Nov. 18, 2010.

*Primary Examiner* — Mohammad Anwar
(74) *Attorney, Agent, or Firm* — Handal & Morofsky, LLC

(57) ABSTRACT

A method, device and system for determining resource locations are disclosed in the invention, wherein the method includes the following steps: a user equipment (UE) receiving the High-speed Shared Control Channel (HS-SCCH) from a network side equipment; according to said HS-SCCH, the said UE obtaining the time slot on which the High-speed Downlink Shared Channel (HS-DSCH) is located; according to the time slot on which said HS-DSCH is located, said UE determining the sub-frame on which said HS-DSCH is located; the UE receiving the HS-DSCH from said network-side device in the time-slots, which said HS-DSCH is located on, in the subframe which said HS-DSCH is located on. In the invention, the UE is enabled to determine the sub-frame on which the UE is located, according to the time-slots which are distributed by a base-station and the HS-DSCH is located on; while the HS-DSCH resource of TS0 is distributed to the UE, sufficient time for decoding the HS-SCCH is reserved for the UE, thus, when TS0 is adopted as the HS-DSCH resource in the TD-SCDMA system, the problem that the UE cannot accomplish HS-SCCH decoding and HS DSCH data reception in time is solved.

12 Claims, 11 Drawing Sheets

METHOD, DEVICE AND SYSTEM FOR DETERMINING RESOURCE LOCATIONS

This application claims the priority of China Patent Application Ser. NO. 200910090792.5, entitled METHOD, DEVICE AND SYSTEM FOR DETERMINING RESOURCE LOCATIONS, submitted on Aug. 11, 2009, the contents of which are hereby incorporated in their entirety.

TECHNICAL FIELD

The present disclosure relates generally to communication technology, and, more particularly, to a method, device and system for determining resource locations.

BACKGROUND

The TD-SCDMA (Time Division-Synchronous Code Division Multiple Access) has introduced HSDPA (High Speed Downlink Packet Access) technology in the Release5 of 3GPP (3rd Generation Partnership Project), which improves the downlink rates of UE.

As shown in FIG. 1 the frame structure in a TD-SCDMA mobile communication system; wherein the TTI (transmission time interval) in HSDPA is a subframe (5 ms), in the transmission process of HSDPA, the equipment on network side allocate a set of HS-SCCHs (High-Speed Shared Control Channel) to each UE, which is used in performing constantly monitoring for UE.

Specifically, when performing scheduling to all the users in cell, the base station needs to confirm scheduling time, and, which user and from which physical resource should the data be scheduled to sent to, then inform the UE of receiving data in corresponding physical resource via HS-SCCH; wherein the UE receiving the data according to the information informed by the HS-SCCH whether it is the first transmission or retransmission.

In present protocol, for ensuring the coverage and the quality of P-CCPCH (primary common control physical channel), the resource of timeslot 0 on secondary carriers have not been used yet, the TS0 could not be conducted as the resource of HS-DSCH (High-Speed Downlink Shared Channel). However, in the present cell of TD-SCDMA system with N frequency point, as the introduction of F frequency band, the appliance of TS0 would be reconsidered.

In the implementing procedure of the invention, the applicant found at least following problems in present technique:

In TD-SCDMA system, when it is needed to consider using secondary carrier TS0 and the secondary carrier TS0 is used as HS-DSCH resource, according to the typical configuration of present system, generally HS-SCCH is allocated in TS6, if the HS-DSCH allocated to base station is in TS0, then the timing relationship shown in FIG. 2 would arise, as HS-SCCH and HS-DSCH are two adjacent time slots; it will happen that the network side has began sending downlink data on HS-DSCH before UE has decoded the HS-DSCH yet, the UE could not complete decoding HS-SCCH before receiving HS-DSCH data.

CONTENTS OF THE INVENTION

The invention provides a method, device and system for determining resource locations, aiming at determining the location of the subframe of the HS-DSCH allocated by base station precisely.

In order to attain the aforementioned object, the embodiments of the invention provide a method for determining resource locations, comprising:

User equipment (UE) obtaining the time slot where HS-DSCH (High-Speed Downlink Shared Channel) locates according to HS-SCCH (High-Speed Shared Control Channel);

Said UE determining the subframe where said HS-DSCH locates according to the time slot where said HS-DSCH locates.

On the other hand, the embodiments of the invention provide a user equipment UE, comprising:

Obtaining module for obtaining the time slot where HS-DSCH locates according to HS-SCCH.

Determining module for determining the subframe where said HS-DSCH locates according to the time slot where the HS-DSCH that obtained by said obtaining module locates.

On the other hand, the embodiments of the invention provide an equipment on network side, comprising:

Processing module for adding the time slot information of HS-DSCH in HS-SCCH, and sending said HS-SCCH to UE, obtaining the time slot where said HS-DSCH locates based on said HS-SCCH by said UE, and determining the subframe where said HS-DSCH locates based on the time slot where said HS-DSCH locates;

Sending module for sending said HS-DSCH to UE according to the time slot information of HS-DSCH which added by said processing module and receiving said HS-DSCH in the time slot of the subframe where said HS-DSCH locates by said UE.

On the other hand, the embodiments of the invention provide a system for determining resource locations, comprising:

Equipment on network side for sending HS-SCCH to UE;

UE for obtaining the time slot where HS-DSCH locates according to said HS-SCCH; and determining the subframe where said HS-DSCH locates according to the time slot where said HS-DSCH locates; and receiving the HS-DSCH from said equipment on network side in the time slot of the subframe where said HS-DSCH locates.

Compared with present techniques, the embodiments of the invention have the following advantages:

UE could determine the subframe in which the HS-DSCH is located according to the time slot in which the HS-DSCH is located, which is allocated by base station; when the HS-DSCH resource of TS0 has been allocated to UE, enough time is reserved for UE to perform decoding of HS-SCCH, which solves the problem that the UE could not complete decoding HS-SCCH before receiving HS-DSCH data while TS0 is allocated as the resource of HS-DSCH in TD-SCDMA system.

Furthermore, in the embodiments of the invention, the fixed interval between HS-SCCH resource and HS-DSCH resource could be adjusted according to actual need, which avoids HS-SICH conflict when network side equipment allocating different resource to UE of different types.

MODE OF CARRYING OUT THE INVENTION

Figure 1:
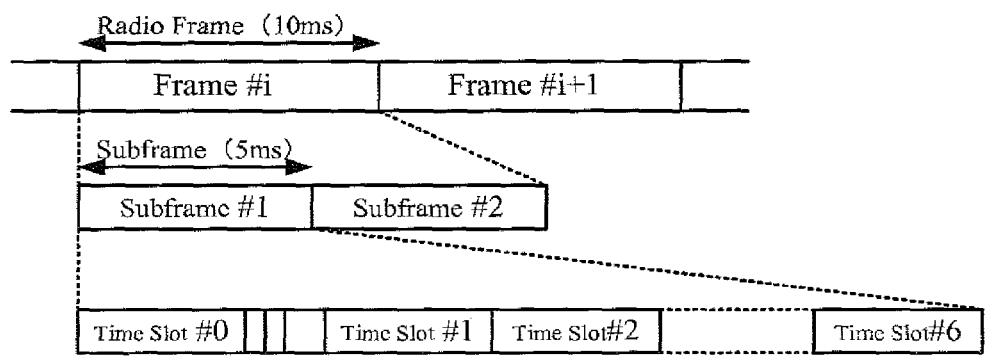
FIG. 1 illustrates the frame structure in TD-SCDMA mobile communication system in present technique.
Figure 2:
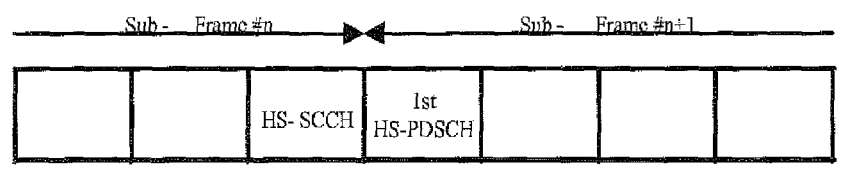
FIG. 2 illustrates the timing relationship when the HS-DSCH allocated to base station in TS0 in present technique.
Figure 3:
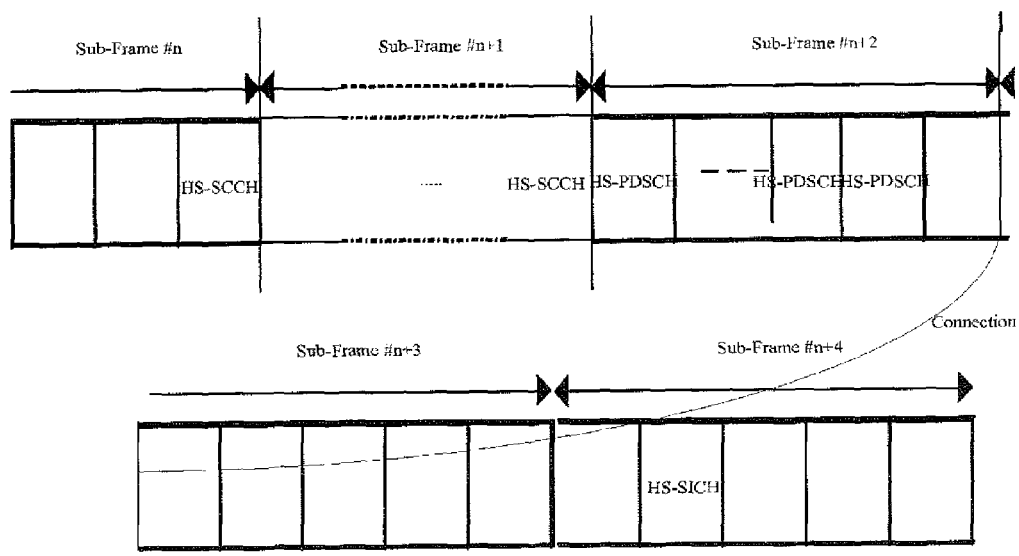
FIG. 3 is a schematic diagram of conflicts in scheduling process in present technique.

As stated in background, if TS0 is used as the resource of HS-DSCH in TD-SCDMA system, it will happen that UE could not complete decoding HS-SCCH before receiving HS-DSCH data in time; moreover, if it is specified that the HS-DSCH allocated by network side including TS0 is in the (n+2)-th subframe following the HS-SCCH in the n-th subframe fixedly, and the timing relationship between last HS-DSCH and HS-SICH remains the same as legacy timing relationship, For legacy HSDPA UE (the UE do not support allocating HS-DSCH resource in TS0), the timing relationship could not be changed; at present, if it is required for base station that distinguishing legacy HSDPA UE and the UE supporting HS-DSCH allocated in TS0 while scheduling, the scheduling process would be complicated and the conflicts would arise, as a situation of conflict shown in FIG. 3. In the subframe #n, base station has allocated the HS-DSCH resources including TS0 to UE1 via HS-SCCH, the said HS-DSCH is in the TS0 and TS5 of subframe #n+2; according to the timing relationship between HS-DSCH and HS-SICH (High-Speed Shared Information Channel), UE1 needs to transmit HS-SICH feedback in subframe #n+4. Meanwhile, if base station performs scheduling to a legacy HSDPA UE2 with the same HS-SCCH in subframe #n+1, to which the resource allocated is the time slot 4 resource of subframe #n+2, at present, UE2 needs to transmit feedback by the same HS-SICH in subframe #n+4, thus produce the conflict on feedback between UE1 and UE2.

To solve above problems, the embodiments of the invention provide a method, device and system for determining resource locations, in the method for determining resource locations, after the equipment on network side send HS-SCCH to UE, the UE judging whether the HS-DSCH resource includes time slot 0 according to the instruction of the HS-SCCH, if the time slot 0 is not included, then the subframe where the HS-DSCH locates is the subframe N+1 which is next to the subframe N where the HS-SCCH locates; if the time slot 0 is included, then the subframe where the HS-DSCH of time slot 0 locates is the subframe N+2, which is following the subframe N where HS-SCCH locates, the subframe where the HS-DSCH resource of other time slot locates is the subframe N+1 which is next to the subframe N where the HS-SCCH locates.

Through the method above, UE could determine the subframe on which the HS-DSCH is located according to the time slot on which the HS-DSCH is located, in which the HS-DSCH is allocated by base station; when the HS-DSCH resource of TS0 has been allocated to UE, enough time is reserved for UE to perform decoding to HS-SCCH, which solves the problem that the UE could not complete decoding HS-SCCH before receiving HS-DSCH data timely while TS0 is allocated as the resource of HS-DSCH in TD-SCDMA system. Furthermore, in the embodiments of the invention, the fixed interval between HS-SCCH resource and HS-DSCH resource could be adjusted according to actual need, which avoids HS-SICH conflict when network side equipment allocating different resource to UE of different types.

Figure 4:
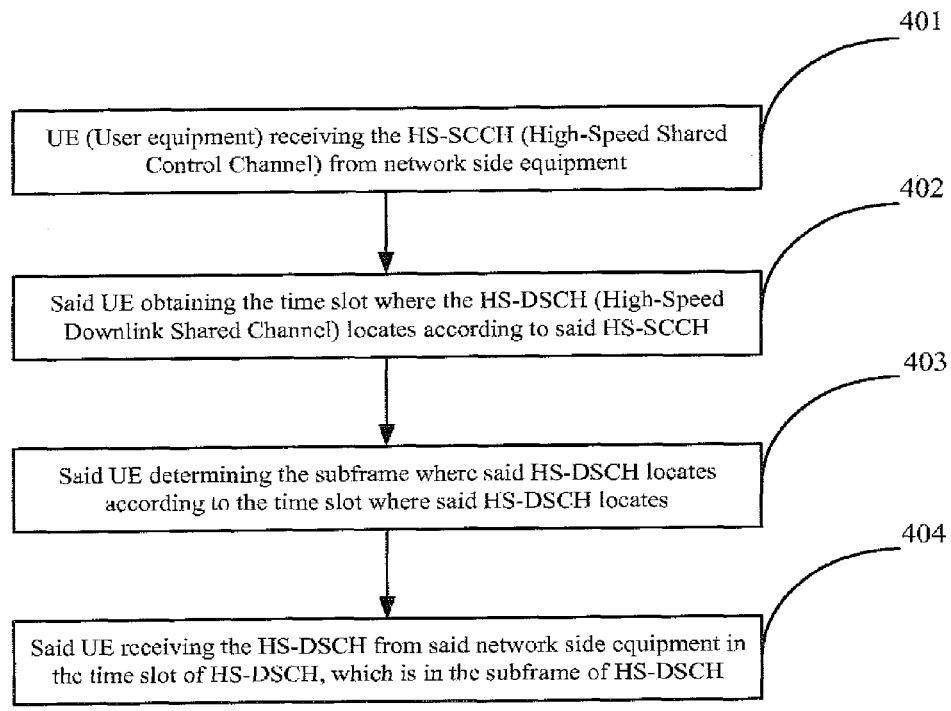
FIG. 4 is a schematic flow of a method for determining resource locations which provide by the embodiment 1 of the invention.
Figure 5:
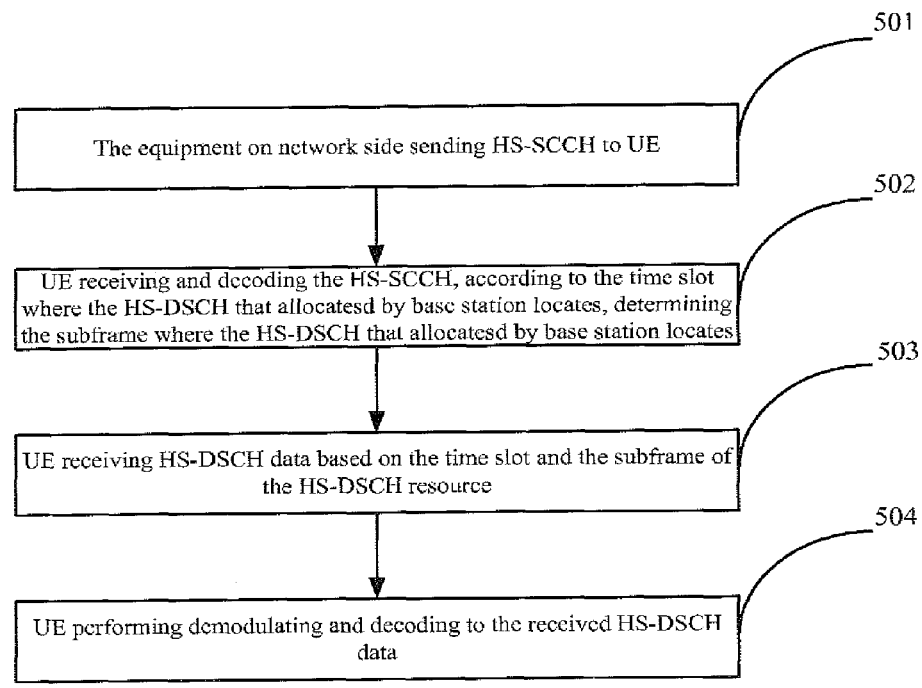
FIG. 5 is a schematic flow of a method for determining resource locations which provide by the embodiment 2 of the invention.

As shown in FIG. 4, a method for determining resource locations is provided by the embodiment 1 of the invention, comprising:

Step 401, UE (User equipment) receiving the HS-SCCH (High-Speed Shared Control Channel) from network side equipment.

Step 402, said UE obtaining the time slot where the HS-DSCH (High-Speed Downlink Shared Channel) locates according to said HS-SCCH.

Therein, the said UE obtaining the time slot where the HS-DSCH locates according to said HS-SCCH, comprising: said UE performing decoding to said HS-SCCH, said decoded HS-SCCH have carried the time slot information of said HS-DSCH.

Step 403, said UE determining the subframe where said HS-DSCH locates according to the time slot where the said HS-DSCH locates.

Therein, the said UE determining the subframe where said HS-DSCH locates according to the time slot where the said HS-DSCH locates, comprising:

Said UE determining whether the time slot where said HS-DSCH locates comprising time slot 0; if the time slot where said HS-DSCH locates do not comprise time slot 0, said UE confirming the subframe where said HS-DSCH locates as the subframe N+1 that next to the subframe N where said HS-SCCH locates; if the time slot where said HS-DSCH locates only including the time slot 0, said UE confirming the subframe where said HS-DSCH locates as the subframe N+2 that following the subframe N where said HS-SCCH locates; if the time slot where said HS-DSCH locates including the time slot 0 and other time slots, said UE confirming the subframe where the HS-DSCH of time slot 0 locates as the subframe N+2 that following the subframe N where said HS-SCCH locates, the subframe where the HS-DSCH of other time slots locates as the subframe N+1 that next to the subframe N where said HS-SCCH locates.

Step 404, said UE receiving the HS-DSCH from said network side equipment in the time slot of HS-DSCH, which is in the subframe of HS-DSCH.

Furthermore, after said UE receiving the HS-DSCH from said network side equipment in the time slot of HS-DSCH, which is in the subframe of HS-DSCH, comprising: said UE feedbacking response information to said network side equipment on HS-SICH (High-Speed Sharing Information Channel).

Specifically, the said UE feedbacking response information to said network side equipment on HS-SICH (High-Speed Sharing Information Channel), comprising: if the time slot where said HS-DSCH locates does not including time slot 0, said UE transmitting response information to said network side equipment on the HS-SICH in the (n+2)-th subframe which following the n-th subframe where the HS-DSCH locates; or, if the time slot where said HS-DSCH locates including the time slot 0, said UE transmitting the response information to said network side equipment on the HS-SICH in the (n+1)-th subframe which next to the n-th subframe where the HS-DSCH of timeslot 0 locates.

The said UE transmitting response information to network side equipment on HS-SICH (High-Speed Sharing Information Channel), further comprising: while said UE transmitting response information to network side equipment on HS-SICH, there shall be an offset of at least 8 timeslots between the allocated HS-DSCH of said HS-DSCH and the corresponding HS-SICH.

Through the method provided by the embodiments of the invention, UE could determine the subframe where the HS-DSCH locates according to the time slot where the HS-DSCH locates, which is allocated by base station; when the HS-DSCH resource of TS0 is allocated to UE, sufficient is time for decoding the HS-SCCH is reserved for the UE, when TS0 is adopted as the HS-DSCH resource in the TD-SCDMA system, the problem that the UE cannot accomplish HS-SCCH decoding and HS DSCH data reception in time is solved. And the fixed interval between HS-SCCH resource and HS-DSCH resource could be adjusted according to actual need, which avoids HS-SICH conflict when network side equipment allocating different resource to UE of different types.

The embodiment 2 of the invention provides a method for determining resource locations, which could be applied in the TD-SCDMA system that uses TS0 as the resource of HS-DSCH, certainly it applies to those which do not use TS0 as the resource of HS-DSCH or corresponding applications scenarios in other systems as well, no more unnecessary details are given. As is shown in FIG .5, the method for determining resource locations comprises following steps:

Step 501, the equipment on network side sending HS-SCCH to UE.

Therein, the content carried in the HS-SCCH including without limitation, the physical resource occupied by HS-DSCH, the modulation mode for the transmission, the size of transmission block, the HARQ (Hybrid Automatic Repeat reQuest) information, indication for new data, UEID and so on.

The equipment on network side including without limitation RNC (Radio Network Controller), NB (Node B), base station and so on, just as a slight clarification, the equipment on network side is not limited to above equipment, all the equipment on network side is within the scope of protection of the embodiments of the invention, to facilitate description, base station is given as the example of the equipment on network side in the embodiments of the invention.

Step 502, UE receiving and decoding the HS-SCCH, according to the time slot where the HS-DSCH that allocated by base station locates, determining the subframe where the HS-DSCH that allocated by base station locates.

Therein, when base station is being about to send downlink enhanced data to one UE in HS-DSCH, first the base station sending HS-SCCH to UE. Through decoding the HS-SCCH, the UE determining the time slot and the subframe where the HS-DSCH locates, thus, receiving HS-DSCH resource at the defined location.

Specifically, the UE determining the subframe where the HS-DSCH that allocated by base station locates according to the time slot where the HS-DSCH that allocated by base station locates, comprising: the UE judging whether the HS-DSCH resource including time slot 0 according to the instruction of the HS-SCCH, if the time slot 0 is not included, then the subframe where the HS-DSCH locates is the subframe N+1 which is next to the subframe N where the HS-SCCH locates; if the time slot 0 is included, then the subframe where the HS-DSCH of time slot 0 locates is the subframe N+2, which is following the subframe N where HS-SCCH locates, the subframe where the HS-DSCH resource of other time slot locates is the subframe N+1, which is next to the subframe N where the HS-SCCH locates.

Furthermore, if time slot 0 is not included, the subframe where HS-DSCH locates and confirmed as the subframe N+1 that next to the subframe N where HS-SCCH locates, is determined according to the timely relationship between the HS-SCCH and the HS-DSCH in present HSDPA, specifically the timely relationship is corresponding to next valid HS-DSCH allocation, the time slot information corresponding to the HS-DSCH is carried by the HS-SCCH, the indicated HS-DSCH would be sent at the next subframe of HS-SCCH in which carries the corresponding HS-DSCH information.

Figure 6:
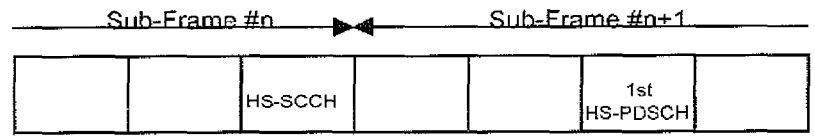
FIG. 6 is a schematic diagram of the timing relationship between HS-SCCH and HS-DSCH in the embodiments of the invention.

A timely relationship between HS-SCCH and HS-DSCH is shown in is FIG. 6. Therein the DwPTS (Downlink Pilot Time Slot) and the UpPTS (Uplink Pilot Time slot) are not considered in the timely relationship.

Step 503, UE receiving HS-DSCH data based on the time slot and the subframe of the HS-DSCH resource.

Therein, when UE decoding the HS-SCCH, the time slot where the HS-DSCH that allocated by base station locates could be obtained. Furthermore, according to the conducting process in Step 502 the subframe where HS-DSCH locates could be determined, which means the UE could receive HS-DSCH data based on the time slot and the subframe.

Step 504, UE performing demodulating and decoding to the received HS-DSCH data, and sending ACK in HS-SICH (ACKnowledge Character) as feedback, or NACK and CQI (Channel Quality Indicator) information; which means the UE needs to return response information to base station. It should be pointed out that the HS-SICH location is pre-informed to UE by equipment on network side, and will not be described here anymore.

Figure 7:
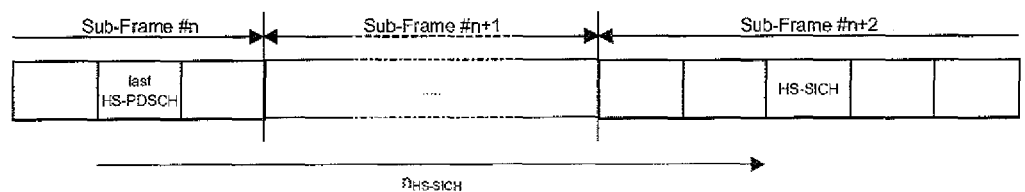
FIG. 7 is a schematic diagram of the timing relationship between HS-DSCH and HS-SICH in the embodiments of the invention.

Specifically, it has location requirement for the subframe where the HS-SICH locates, if time slot 0 is not included in HS-DSCH data, the subframe where the HS-SICH locates is determined according to the timely relationship between the HS-DSCH and the HS-SICH in present HSDPA; specifically the timely relationship is: A HS-SICH is needed to be corresponding to HS-SCCH, and by the HS-SICH the ACK/NACK information and the CQI information is carried. Furthermore, the correspondence between the HS-SCCH and HS-SICH is pre-defined by equipment on network side, for all UE it's the same; therein, for UE there shall be an offset of $n_{HS\text{-}SICH} \geq 9$ time slots between the HS-DSCH and the corresponding HS-SICH, which means it takes 9 time slots when HS-SICH is to be sent after receiving the last HS-DSCH. A timely relationship between HS-DSCH and HS-SICH is shown in FIG. 7. Similarly, DwPTS and UpPTS are not considered in the timely relationship. Therein, in CELL-DCH condition and CELL_FACH (forward access Channel) condition, the UE with specific identification will send the ACK/NACK corresponding to HS-DSCH at next available HS-SICH.

In the embodiments of the invention, if time slot 0 is included in HS-DSCH, the HS-SICH feedback of UE must be sent in the (n+1)-th subframe which next to the n-th subframe where the HS-DSCH of time slot 0 locates, which avoids HS-SICH conflict when network side equipment allocating different resource to UE of different types. For the example of conflict shown in FIG. 3; in subframe #n, base station allocating the HS-DSCH resource of TS0 of subframe #n+2 to the UE1 which support allocating HS-DSCH in TS0 via HS-SCCH; in the embodiments of the invention, UE1 will perform HS-SICH feedback in subframe #n+3 (in present technique, according to the timely relationship between HS-DSCH and HS-SICH, UE1 needs perform HS-SICH feedback in subframe #n+4). If base station performs scheduling to a legacy HSDPA (the UE without allocating TS0) UE2 with the same HS-SCCH in subframe #n+1, to which the resource allocated is the time slot 4 resource of subframe #n+2, at present, according to the timely relationship between HS-DSCH and HS-SICH, UE2 needs to transmit feedback with HS-SICH in subframe #n+4, it could be seen that when time slot 0 is included in HS-DSCH data, the HS-SICH feedback of UE is to be sent in the (n+1)-th subframe which next to the n-th subframe where the HS-DSCH of time slot 0 locates, which avoids the conflict between UE1 and UE2.

Obviously, as each subframe comprises 7 time slots, the HS-SICH feedback of UE must be sent in the (n+1)-th subframe which next to the n-th subframe where the HS-DSCH of time slot 0 locates, which means the UE needs to determine the subframe where the HS-SICH locates as feedback according to the $n_{HS\text{-}SICH} \geq 8$ time slots; in which process there's no need considering DwPTS and UpPTS as well.

Following are the detail descriptions with 3 specific situations for the method that for determining resource locations in the embodiments of the invention, the 3 situations comprising: time slot 0 is not included in HS-DSCH resource; the HS-DSCH resource only including the time slot 0; the HS-DSCH resource including time slot 0 and other time slots.

Figure 8:
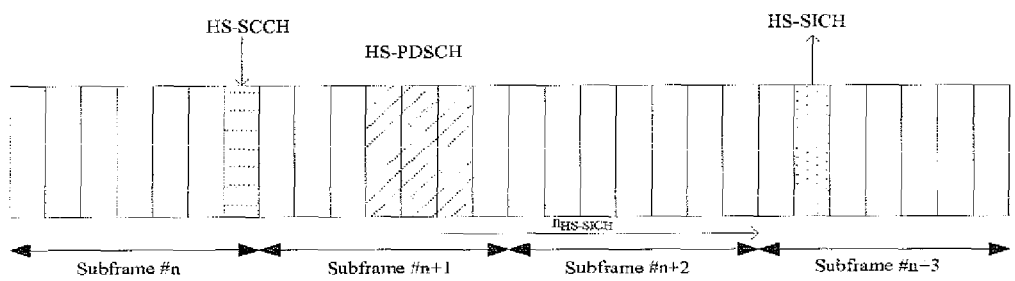
FIG. 8 is a schematic diagram of a correspondence to which among the location of HS-DSCH, HS-DSCH and HS-SICH provide by the embodiment 3 of the invention.
Figure 9:
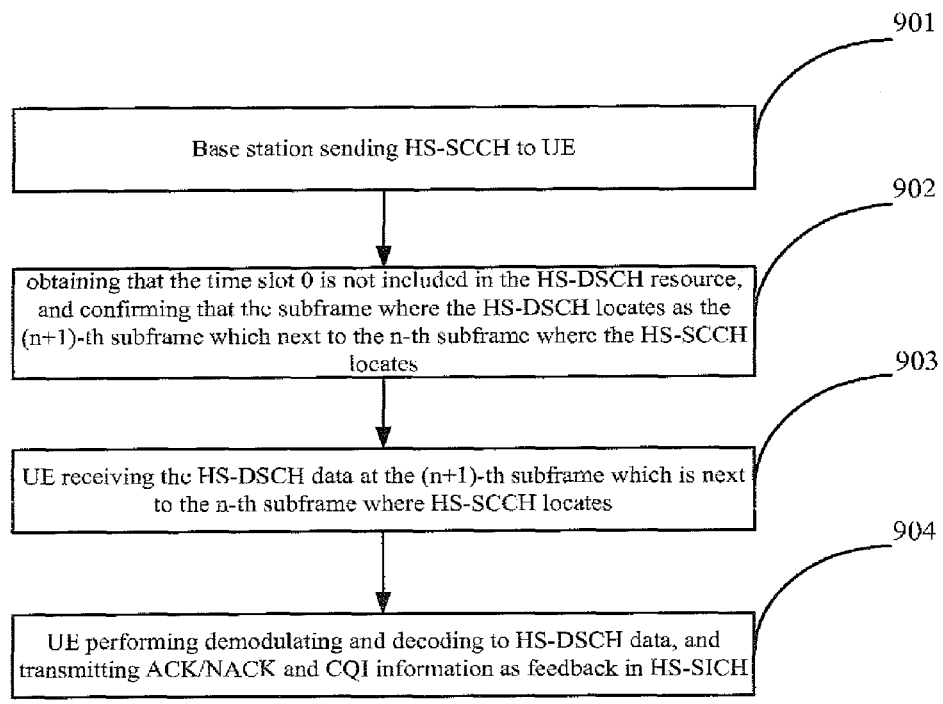
FIG. 9 is a schematic flow of a method for determining resource locations which provide by the embodiment 3 of the invention.

Based on the method for determining resource locations in the embodiment 2 of the invention, a method for determining resource locations is provided in the embodiment 3 of the invention, the method is in the application scenario of embodiment 2, in which situation the time slot 0 is not included in the HS-DSCH resource; as the HS-DSCH locations and the correspondence between the HS-DSCH locations and the HS-SICH locations that shown in FIG. 8, the correspondence is a illustrative situation, other correspondence could be chosen according to actual needs, the method that for determining resource locations is as shown in FIG. 9, comprising:

Step 901, base station sending HS-SCCH to UE, in which the base station indicating the UE that the HS-DSCH allocated to the UE locating at time slot 3 to time slot 5 via the HS-SCCH; certainly the time slot situation could be optional according to the actual needs, only the time slot 0 is not included in the time slot.

Step 902, UE receiving and decoding the HS-SCCH, obtaining that the time slot 0 is not included in the HS-DSCH resource, and confirming that the subframe where the HS-DSCH locates as the (n+1)-th subframe which next to the n-th subframe where the HS-SCCH locates.

Specifically, after decoding HS-SCCH correctly, the UE has is determined that the HS-DSCH resource which is indicated by the HS-SCCH don't comprise time slot 0, then the subframe where the HS-DSCH which is allocated by the base station locates is considered as the (n+1)-th subframe which next to the n-th subframe where the HS-SCCH locates. The time slot 3 to time slot 5 in the (n+1)-th subframe of HS-DSCH.

Step 903, UE receiving the HS-DSCH data at the (n+1)-th subframe which is next to the n-th subframe where HS-SCCH locates, in which the time slot of the UE receiving the data is pre-defined, it unnecessary gives more details.

Step 904, UE performing demodulating and decoding to HS-DSCH data, and transmitting ACK/NACK and CQI information as feedback in HS-SICH, therein the feedback in HS-SICH is proceeded in the corresponding subframe according to the present timely relationship.

Figure 10:
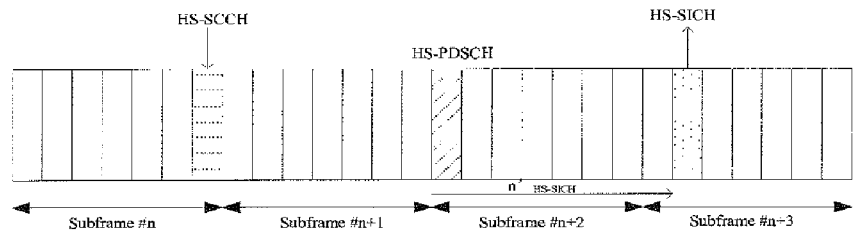
FIG. 10 is a schematic diagram of a correspondence to which among the location of HS-DSCH, HS-DSCH and HS-SICH provide by the embodiment 4 of the invention.
Figure 11:
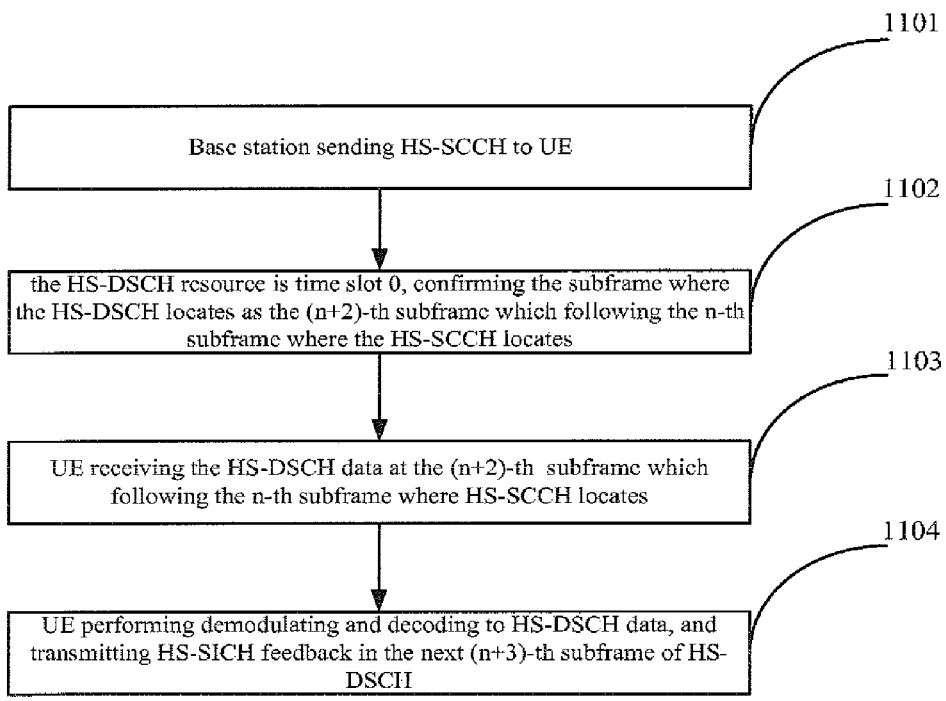
FIG. 11 is a schematic flow of a method for determining resource locations which provide by the embodiment 4 of the invention.

According to the method for determining resource locations in the embodiment 2 of the invention, a method for determining resource locations is provided by the embodiment 4 of the invention, in which method the HS-DSCH resource only including time slot 0; as the HS-DSCH locations and the correspondence between the HS-DSCH locations and the HS-SICH locations that shown in FIG. 10, the correspondence is a illustrative situation, other correspondence could be chosen according to actual needs, the method that for determining resource locations is as shown in FIG. 11, comprising:

Step 1101, base station sending HS-SCCH to UE, in which the base station indicating the UE that the HS-DSCH allocated to the UE locating at time slot 0 via the HS-SCCH.

Step 1102, UE receiving and decoding the HS-SCCH, obtaining that the HS-DSCH resource is time slot 0, confirming the subframe where the HS-DSCH locates as the (n+2)-th subframe which following the n-th subframe where the HS-SCCH locates.

Step 1103, UE receiving the HS-DSCH data at the (n+2)-th subframe which following the n-th subframe where HS-SCCH locates.

Step 1104, UE performing demodulating and decoding to HS-DSCH data, and transmitting HS-SICH feedback in the next (n+3)-th subframe of HS-DSCH.

It should be pointed out that as the correspondence shown in FIG. 10, the HS-SICH is allocated at TS1 (pre-defined by the equipment on network side and UE); obviously there is only 8 time slots between the HS-DSCH and the HS-SICH; to ensure the timely relationship between the HS-SCCH and the HS-SICH, UE must perform HS-SICH feedback in subframe #n+3.

Figure 12:
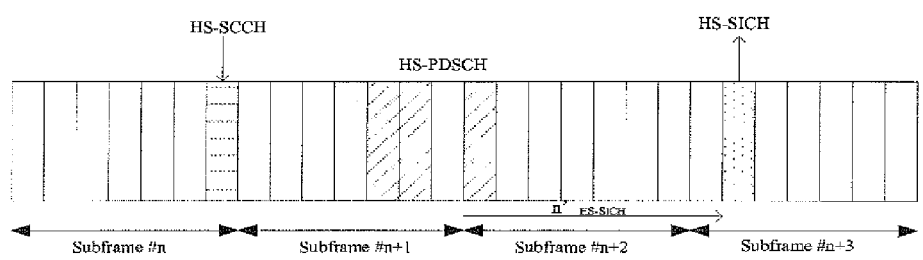
FIG. 12 is a schematic diagram of a correspondence to which among the location of HS-DSCH, HS-DSCH and HS-SICH provide by the embodiment 5 of the invention.
Figure 13:
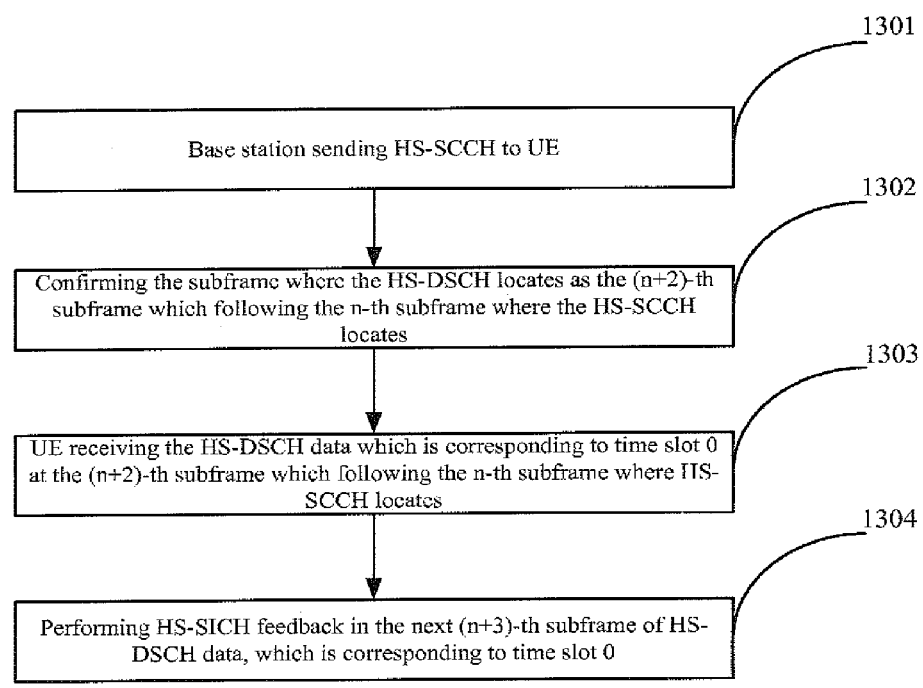
FIG. 13 is a schematic flow of a method for determining resource locations which provide by the embodiment 5 of the invention.

According to the method for determining resource locations in the embodiment 2 of the invention, a method for determining resource locations is provided by the embodiment 5 of the invention, in which method the HS-DSCH resource including time slot 0 and other time slot; as the HS-DSCH locations and the correspondence between the HS-DSCH locations and the HS-SICH locations that shown in FIG. 12, the correspondence is a illustrative situation, other correspondence could be chosen according to actual needs, the method that for determining resource locations is as shown in FIG. 13, comprising:

Step 1301, base station sending HS-SCCH to UE, in which the base station indicating the UE that the HS-DSCH allocated to the UE locating at time slot 0, time slot 4 and time slot 5 via the HS-SCCH.

Step 1302, UE receiving and decoding the HS-SCCH, obtaining that the HS-DSCH resource is time slot 0, time slot 4 and time slot 5, confirming the subframe where the HS-DSCH locates as the (n+2)-th subframe which following the n-th subframe where the HS-SCCH locates, and confirming the subframe where the HS-DSCH resource of time slot 4 and time slot 5 locates as the (n+1)-th subframe which next to the n-th subframe where the HS-SCCH locates.

Step 1303, UE receiving the HS-DSCH data which is corresponding to time slot 0 at the (n+2)-th subframe which following the n-th subframe where HS-SCCH locates; and receiving the HS-DSCH data which is corresponding to time slot 4 and time slot 5 at the (n+1)-th subframe, which is next to the n-th subframe where the HS-SCCH locates.

Step 1304, UE performing demodulating and decoding to HS-DSCH data, and performing HS-SICH feedback in the next (n+3)-th subframe of HS-DSCH data, which is corresponding to time slot 0.

It's obviously that through the method provided by the embodiments of the invention under above 3 situations, UE could determine the subframe on which the HS-DSCH is located according to the time slot on which the HS-DSCH is located, in which the HS-DSCH is allocated by base station; when the HS-DSCH resource of TS0 has been allocated to UE, enough time is reserved for UE to perform decoding to HS-SCCH, which solves the problem that the UE could not complete decoding HS-SCCH before receiving HS-DSCH data timely while TS0 is allocated as the resource of HS-DSCH in TD-SCDMA system. Furthermore, in the embodiments of the invention, the fixed interval between HS-SCCH resource and HS-DSCH resource could be adjusted according to actual need, which avoids HS-SICH conflict when network side equipment allocating different resource to UE of different types.

Figure 14:
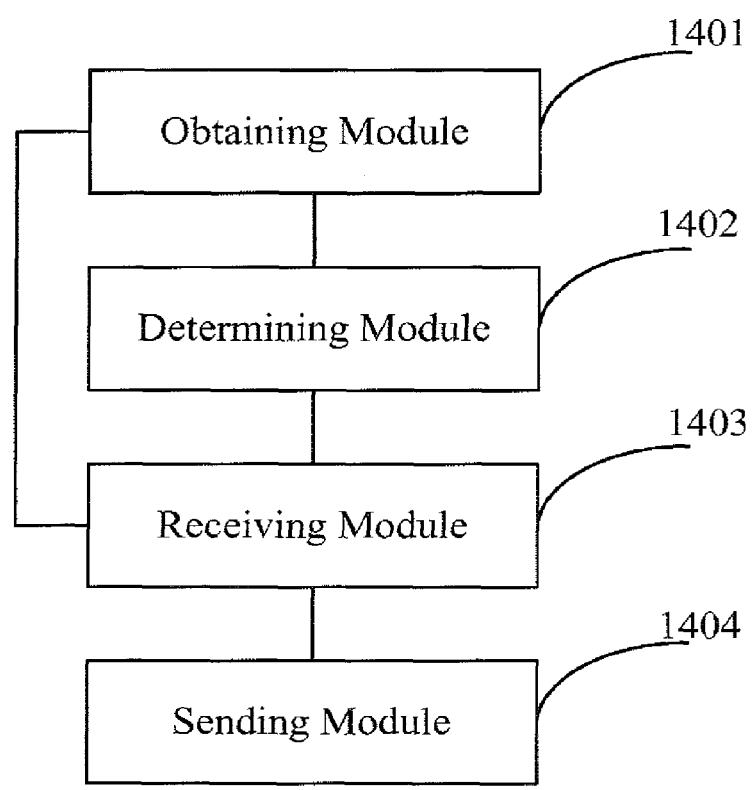
FIG. 14 illustrates the structure schematic drawing of user equipment provided by the embodiment 6 of the invention.

A user equipment UE is provided by the embodiment 6 of the invention, as is shown in FIG. 14, comprising:

Obtaining module 1401 for obtaining the time slot where HS-DSCH locates according to HS-SCCH.

Specifically said obtaining module 1401 is for performing decoding to said HS-SCCH, and obtaining the time slot where the HS-DSCH is locates according to said decoded HS-SCCH; in said decoded HS-SCCH carrying the information of the time slot where said HS-DSCH locates.

Determining module 1402 for determining the subframe where said HS-DSCH locates according to the time slot where the HS-DSCH that obtained by said obtaining module 1401 locates.

Specifically said determining module 1402 is for confirming the subframe where said HS-DSCH locates as the (n+2)-th subframe which following the n-th subframe where said HS-SCCH locates while the time slot where said HS-DSCH locates only including time slot 0; when the time slot where said HS-DSCH locates including time slot 0 and other time slots, confirming the subframe where said HS-DSCH locates as the (n+2)-th subframe that following the n-th subframe where said HS-SCCH locates; the subframe where the HS-DSCH of other time slots locates is the (n+1)-th subframe which next to the n-th subframe where said HS-SCCH locates.

Receiving module 1403 for receiving the HS-DSCH from said equipment on network side in the time slot of the subframe where said HS-DSCH locates;

Sending module 1404 for transmitting response information to said equipment on network side in HS-SICH.

Specifically said sending module 1404 is for transmitting response information to said equipment on network side on the HS-SICH in the (n+2)-th subframe which following the n-th subframe where the HS-DSCH locates while time slot 0 is not included in the time slot where said HS-DSCH locates; or, transmitting response information to said equipment on network side on the HS-SICH in the (n+1)-th subframe which next to the n-th subframe where the HS-DSCH of said time slot 0 locates while the time slot where said HS-DSCH locates including the time slot 0.

Besides, while transmitting response information to equipment on network side in HS-SICH, there shall be an offset of at least 8 timeslots between the last HS-DSCH of said HS-DSCH and the corresponding HS-SICH.

Therein, each module in the device of the embodiments of the invention could be integrated as one, and be allocated apart as well. The above modules can be combined into a module, or being divided into more than one sub module.

Figure 15:
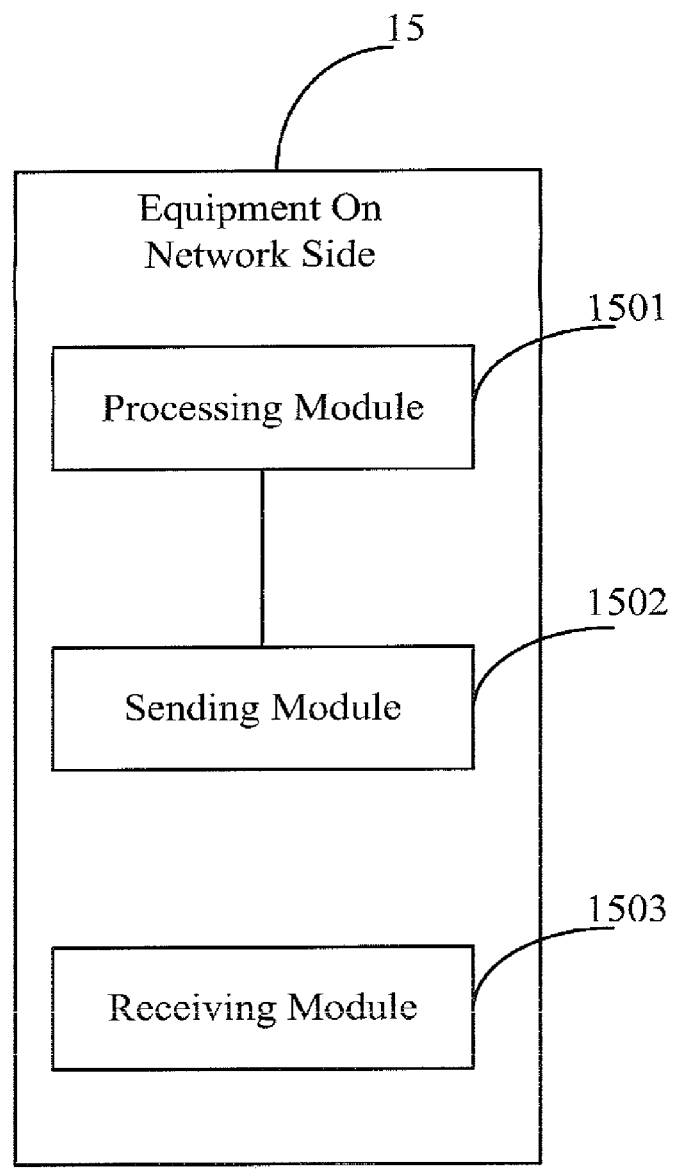
FIG. 15 illustrates the structure schematic drawing of network side equipment provided by the embodiment 7 of the invention.

An equipment on network side 15 is provided by the embodiment 7 of the invention, as is shown in FIG. 15, comprising:

Processing module 1501 for adding the time slot information of HS-DSCH in HS-SCCH, and sending said HS-SCCH to UE, obtaining the time slot where said HS-DSCH locates based on said HS-SCCH by said UE, and determining the subframe where said HS-DSCH locates based on the time slot where said HS-DSCH locates.

Sending module 1502 for sending said HS-DSCH to UE according to the time slot information of HS-DSCH which added by said processing module 1501 and receiving said HS-DSCH in the time slot of the subframe where said HS-DSCH locates by said UE.

Receiving module 1503 for receiving transmitted response information from UE via HS-SICH; therein, if time slot 0 is not included in the time slot where said HS-DSCH locates, then receiving the response information transmitted from said UE on the HS-SICH in the (n+2)-th subframe which is following the n-th subframe where the HS-DSCH locates; or, if time slot 0 is included in the time slot where said HS-DSCH locates, then receiving the response information transmitted from said UE on the HS-SICH in the (n+1)-th subframe which is next to the n-th subframe where the HS-DSCH locates.

Therein, each module in the device of the embodiments of the invention could be integrated as one, and be allocated apart as well. The above modules can be combined into a module, or being divided into more than one sub module.

A system for determining resource locations is provided by the embodiments of the invention, comprising:

Equipment on network side for sending HS-SCCH to UE.

UE for obtaining the time slot where HS-DSCH locates according to said HS-SCCH; and determining the subframe where said HS-DSCH locates according to the time slot where said HS-DSCH locates; and receiving the HS-DSCH from said equipment on network side in the time slot of the subframe where said HS-DSCH locates.

While there have been shown and described illustrative embodiments that determining resource location, it is to be understood that various other adaptations and modifications may be made within the spirit and scope of the present invention. The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

The invention claimed is:

1. A method for determining resource locations, comprising:
   User equipment (UE) obtaining the time slot where HS-DSCH (High-Speed Downlink Shared Channel) locates according to HS-SCCH (High-Speed Shared Control Channel);
   Said UE determining the subframe where said HS-DSCH locates according to the time slot where said HS-DSCH locates; wherein, the said UE determining the subframe where said HS-DSCH locates according to the time slot where said HS-DSCH locates, comprising:
   when the time slot where said HS-DSCH locates only including time slot 0, said UE confirming that the said HS-DSCH locates in the (n+2)-th subframe following the n-th subframe where said HS-SCCH locates;
   when the time slot where said HS-DSCH locates including the time slot 0 and other time slots, said UE confirming that the said HS-DSCH of time slot 0 locates in the (n+2)-th subframe following the n-th subframe where said HS-SCCH locates, and the HS-DSCH of other time slots locates in the (n+1)-th subframe which next to the n-th subframe where said HS-SCCH locates.

2. The method as in claim 1, characterized in that, the user equipment (UE) obtaining the time slot where HS-DSCH (High-Speed Downlink Shared Channel) locates according to HS-SCCH (High-Speed Shared Control Channel), comprising:
   Said UE performing decoding to said HS-SCCH, and obtaining the time slot where HS-DSCH locates according to the decoded HS-SCCH; said decoded HS-SCCH carrying the information of the time slot where said HS-DSCH locates.

3. The method as in claim 1, characterized in that, after the said UE determining the subframe where said HS-DSCH locates according to the time slot where said HS-DSCH locates, comprising:
   Said UE receiving the HS-DSCH from said network side equipment in the time slot of HS-DSCH, which is in the subframe of HS-DSCH;
   Said UE transmitting response information to said network side equipment on HS-SICH (High-Speed Sharing Information Channel).

4. The method as in claim 3, characterized in that, the said UE transmitting response information to said network side equipment on HS-SICH (High-Speed Sharing Information Channel), comprising:
   When the time slot where said HS-DSCH locates including time slot0, said UE transmitting the response information to said network side equipment on the HS-SICH in the (n+1)-th subframe which is next to the n-th subframe where the HS-DSCH of timeslot 0 locates.

5. The method as in claim 4, characterized in that, the said UE transmitting response information to said network side equipment on HS-SICH (High-Speed Sharing Information Channel), comprising:
   While said UE transmitting response information to network side equipment on HS-SICH, there shall be an offset of at least 8 timeslots between the last HS-DSCH of said HS-DSCH and the corresponding HS-SICH.

6. A user equipment UE, comprising:
   Obtaining module for obtaining the time slot where HS-DSCH locates according to HS-SCCH;
   determining module for determining the subframe where said HS-DSCH locates according to the time slot where the HS-DSCH that obtained by said obtaining module locates; wherein,
   specifically said determining module is for confirming that the subframe where said HS-DSCH locates in the (n+2)-th subframe following the n-th subframe where said HS-SCCH locates while the time slot where said HS-DSCH locates only including time slot 0; when the time slot where said HS-DSCH locates including time slot 0 and other time slots, confirming the subframe where said HS-DSCH locates in the (n+2)-th subframe following the n-th subframe where said HS-SCCH locates; the subframe where the HS-DSCH of other time slots locates is the (n+1)-th subframe, which is next to the n-th subframe where said HS-SCCH locates.

7. The UE as in claim 6, characterized in that,
   specifically said obtaining module is for performing decoding to said HS-SCCH, and obtaining the time slot where the HS-DSCH locates according to said decoded HS-SCCH; in said decoded HS-SCCH carrying the information of the time slot where said HS-DSCH locates.

8. The UE as in claim 6, further comprising:
   Receiving module for receiving the HS-DSCH from said equipment on network side in the time slot of the subframe where said HS-DSCH locates;
   Sending module for transmitting response information to said equipment on network side in HS-SICH.

9. The UE as in claim 8, characterized in that,
   Specifically said sending module is for transmitting response information to said equipment on network side on the HS-SICH in the (n+1)-th subframe, which is next to the n-th subframe where the HS-DSCH of said time slot 0 locates while the time slot where said HS-DSCH locates including the time slot 0.

10. The UE as in claim 9, characterized in that,
    While transmitting response information to network side equipment on HS-SICH, there shall be an offset of at least 8 timeslots between the last HS-DSCH of said HS-DSCH and the corresponding HS-SICH.

11. An equipment on network side, comprising:
    Processing module for adding the time slot information of HS-DSCH in HS-SCCH, and sending said HS-SCCH to UE, obtaining the time slot where said HS-DSCH locates based on said HS-SCCH by said UE, and determining the subframe where said HS-DSCH locates based on the time slot where said HS-DSCH locates;
    Sending module for sending said HS-DSCH to UE according to the time slot information of HS-DSCH which added by said processing module and receiving said HS-DSCH in the time slot of the subframe where said HS-DSCH locates by said UE; wherein further comprising:
    Receiving module for receiving transmitted response information from UE via HS-SICH; therein,
    When time slot 0 is not included in the time slot where said HS-DSCH locates, then receiving the response information transmitted from said UE on the HS-SICH in the (n+2)-th subframe, which is following the n-th subframe where the HS-DSCH locates; or
    When time slot 0 is included in the time slot where said HS-DSCH locates, then receiving the response information transmitted from said UE on the HS-SICH in the (n+1)-th subframe which is next to the n-th subframe where the HS-DSCH locates.

12. A system for determining resource locations, comprising:
    Equipment on network side for sending HS-SCCH to UE;
    UE for obtaining the time slot where HS-DSCH locates according to said HS-SCCH; and determining the subframe where said HS-DSCH locates according to the time slot where said HS-DSCH locates; and receiving the HS-DSCH from said equipment on network side in the time slot of the subframe where said HS-DSCH locates;

wherein, the said UE determining the subframe where said HS-DSCH locates according to the time slot where said HS-DSCH locates, comprising:

when the time slot where said HS-DSCH locates only including time slot 0, said UE confirming that the said HS-DSCH locates in the (n+2)-th subframe following the n-th subframe where said HS-SCCH locates;

when the time slot where said HS-DSCH locates including the time slot 0 and other time slots, said UE confirming that the said HS-DSCH of time slot 0 locates in the (n+2)-th subframe following the n-th subframe where said HS-SCCH locates, and the HS-DSCH of other time slots locates in the (n+1)-th subframe which next to the n-th subframe where said HS-SCCH locates.

\* \* \* \* \*